United States Patent
Krueger et al.

(10) Patent No.: US 6,481,806 B1
(45) Date of Patent: *Nov. 19, 2002

(54) VEHICLE BRAKING APPARATUS HAVING UNDERSTEER CORRECTION WITH AXLE SELECTION

(75) Inventors: Eric Edward Krueger, Ann Arbor, MI (US); Raymond Kurt Schubert, Mountain View, CA (US); Steven Paul Loudon, Howell, MI (US); Eldon Gerrald Leaphart, Southfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/702,536

(22) Filed: Oct. 31, 2000

(51) Int. Cl.[7] ................................................. B60T 8/24
(52) U.S. Cl. ...................................... 303/140; 303/146
(58) Field of Search ................................ 303/139, 140, 303/146, 147

(56) References Cited

U.S. PATENT DOCUMENTS

| | | | |
|---|---|---|---|
| 5,144,559 A | * | 9/1992 | Kamimura et al. ............ 701/37 |
| 5,287,277 A | * | 2/1994 | Mine et al. ................ 280/6.159 |
| 5,369,584 A | * | 11/1994 | Kajiwara ...................... 701/54 |
| 5,515,274 A | * | 5/1996 | Mine et al. .................. 280/6.16 |
| 5,720,533 A | | 2/1998 | Pastor et al. |
| 5,746,486 A | * | 5/1998 | Paul et al. .................... 303/146 |
| 6,015,192 A | * | 6/2000 | Fukumura .................... 303/140 |

* cited by examiner

Primary Examiner—Jack Lavinder
Assistant Examiner—Robert A. Siconolfi
(74) Attorney, Agent, or Firm—Robert M. Sigler

(57) ABSTRACT

A vehicle brake control providing understeer correction through an increase in differential brake pressure favoring the inside wheel applies the increase, in the absence of anti-lock braking activity, across the rear wheels unless one or more sensors indicates a likely low traction condition on the inside rear wheel, in which case the increase is applied to the front pair of wheels. Preferred sensors include a suspension position sensor for the inside rear wheel or other sensor derived information from a suspension control system that indicates large body roll in a turn together with forward body pitch. In the absence of a suspension control system, preferred sensors include vehicle lateral and longitudinal accelerometers indicating vehicle roll and pitch together with a steer angle sensor indicating a significant turn. An indication could also be derived from a normal force sensor on the wheel or normal force information derived from other sensors such as a tire pressure sensor.

10 Claims, 3 Drawing Sheets

VEHICLE BRAKING APPARATUS HAVING UNDERSTEER CORRECTION WITH AXLE SELECTION

TECHNICAL FIELD

The technical field of this invention is the control of understeer in motor vehicles having braking systems.

BACKGROUND OF THE INVENTION

Many motor vehicles are provided with braking systems having yaw stability controls in which a yaw error signal, based on the difference between a calculated desired yaw rate and a sensed or estimated yaw rate, is used to determine and apply a correcting braking force to one or more of the vehicle wheels. Some of these systems specifically address correction of understeer conditions. When the motor vehicle brake controller has operator independent control of all four wheel brakes (a four channel braking system), the preferred corrective action in understeer is an increase in the brake force applied to an inside wheel, relative to the turn, a decrease in the brake force applied to the outside of the wheel, or a combination of the two, in order to produce an increase in yaw rate and thus counteract the understeer condition. In the absence of active anti-lock braking, the change in differential brake pressure is preferably applied to the rear axle. But hard turns can tend to produce a roll of the vehicle body that relatively decreases the normal force, and thus the lateral traction, of the tires on the inside of the turn. In addition, braking in such a hard turn can produce a forward pitch of the vehicle body that further decreases the normal force on the inside rear tire. If these motions produce sufficient roll and pitch, the ability of the inside rear wheel to provide understeer correction can decrease.

A vehicle brake control of the type providing understeer correction in response to the detection of yaw rate error is shown in the U.S. Pat. No. 5,746,486, entitled Brake Control System and issued to Ronald Paul et al on May 5, 1998. This system identifies and signals an understeer condition and provides corrective braking action with an increase in differential brake pressure favoring an inner wheel. The control shown is applicable to a four channel brake system and provides the understeer correction in such a system to the front wheels when ABS is active and to the rear wheels when ABS is not active. When an understeer condition exists with no ABS activity, the system may not produce the most efficient understeer correction, in extreme hard turns, when vehicle roll and/or forward pitch reduce the ability of the inner rear wheel to apply the correction.

SUMMARY OF THE INVENTION

The brake control apparatus of this invention is responsive to one or more sensors to detect in a vehicle turn a likely predetermined low traction on one of a pair of rear wheels on the inside of the turn to provide a low traction indicating signal and uses this signal to determine, when understeer correction is required, an increase in brake pressure on a wheel on the inside of the turn relative to a brake pressure on a wheel on the outside of the turn. In the absence of anti-lock braking activity, the increase is applied to the rear wheels in the absence of the low traction indicating signal but to the front wheels when the low traction indicating signal is present.

Preferred sensors include any vehicle related sensors that indicate reduced normal force on the inside rear wheel or a raised inside rear corner of the vehicle body, which will produce such a reduced normal force and thus a reduced traction compared with the front inside tire. Specifically, preferred sensors include a suspension position sensor for the inside rear wheel or other sensor derived information from a suspension control system that indicates large body roll in a turn together with forward body pitch. In the absence of a suspension control system, preferred sensors include vehicle lateral and longitudinal accelerometers indicating vehicle roll and pitch together with a steer angle sensor indicating a significant turn. An indication could also be derived from a normal force sensor on the wheel or normal force information derived from other sensors such as a tire pressure sensor.

DESCRIPTION OF THE PREFERRED EMBODIMENT

Figure 1:
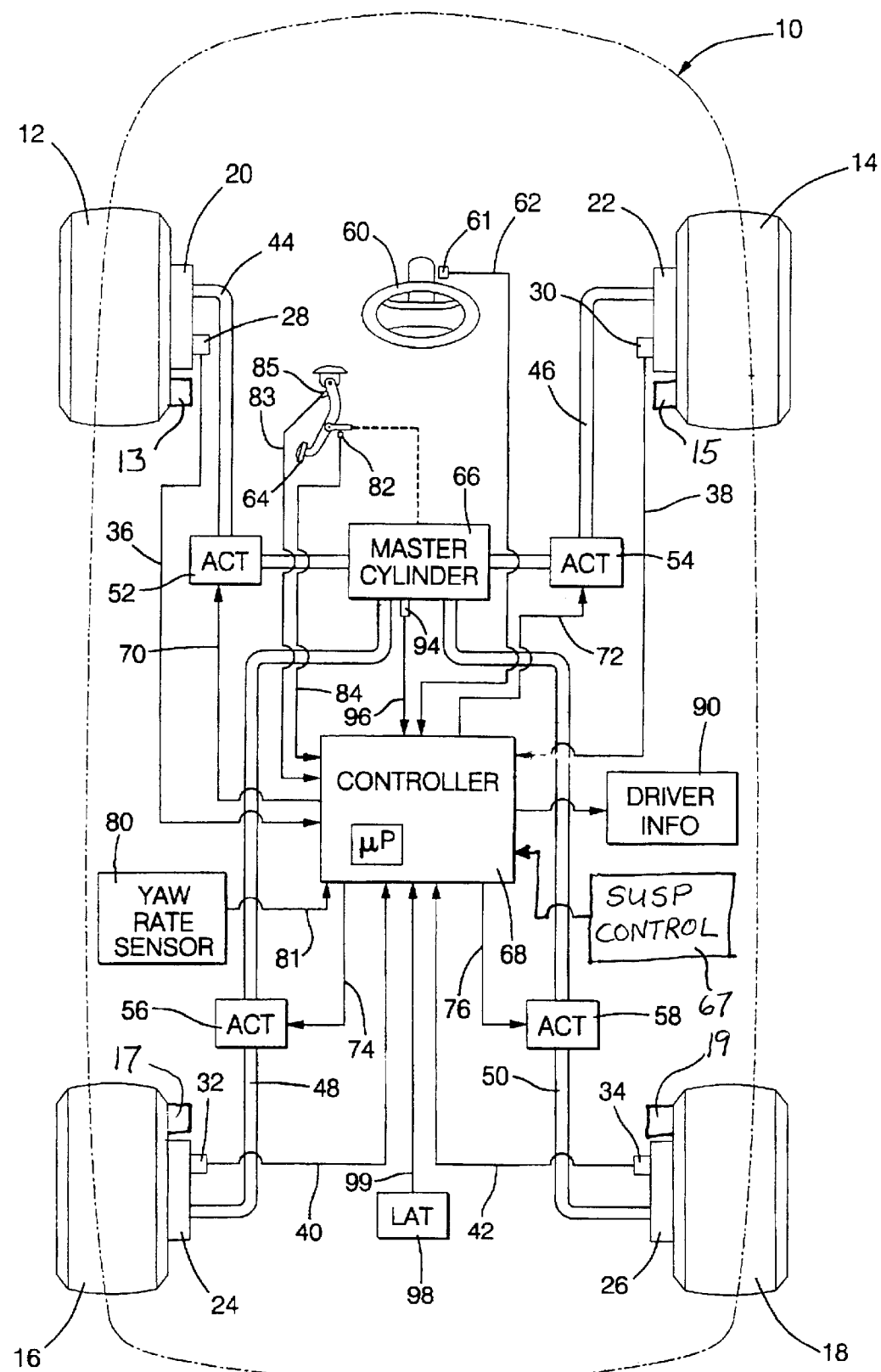
FIG. 1 is a schematic of an embodiment of a vehicle braking system in which this invention may be used.

Referring to FIG. 1, a vehicle 10 is shown as a vehicle body of generally rectangular shape supported near its corners on left front wheel 12, right front wheel 14, left rear wheel 16 and right rear wheel 18, each of the wheels including normal suspension apparatus including a weight bearing spring and a damper. The dampers for wheels 12, 14, 16 and 18 include suspension position sensors 13, 15, 17 and 19, respectively, that provide signals to a suspension control 67 over lines not shown, due to the complexity of the Figure. Suspension control 67 analyzes the suspension motions as indicated by sensors 13, 15, 17 and 19 and generates damping commands for the associated dampers. Suspension control 67 is also able to provide the signals from sensors 13, 15, 17 and 19 to other vehicle control systems.

Vehicle 10 also has steering apparatus 60 associated with front wheels 12 and 14 and a braking system including brake apparatus 20, 22, 24 and 26 at wheels 12, 14, 16 and 18, respectively, an actuating brake pedal 64, a master cylinder 66, brake lines 44, 46, 48 and 50 for providing actuating brake fluid pressure to brakes 20, 22, 24 and 26, and supplementary hydraulic brake actuators 52, 54, 56 and 58 that provide operator independent actuation of the brakes 20, 22, 24 and 26, respectively under control of a controller 68 for ABS (anti-lock braking), traction control, and vehicle yaw stability control, including the functions of the invention described herein.

Various inputs to controller 68 include wheel speed signals on lines 36, 38, 40 and 42 from wheel speed sensors 28, 30, 32 and 34, respectively, a brake pedal switch signal on line 84 from brake pedal switch 82, a brake pedal extended travel signal on line 83 from brake pedal travel sensor 85 (optional), a steering angle signal on line 62 from sensor 61 indicating the angle of steering apparatus 60, a yaw rate signal on line 81 from a yaw rate sensor 80, a master cylinder pressure sensor signal on line 96 from a master cylinder pressure switch 94 (optional) and a lateral acceleration signal on line 99 from lateral accelerometer 98. Furthermore, suspension control 67 provides to controller 68 suspension position signals for each of wheels 12, 14, 16, 18 based on the signals obtained from suspension position sensors 13, 15, 17 and 19. Each of the sensors 13, 15, 17, 19, 28, 30, 32, 34, 61, 80, 82, 85, 98 and 99 is implemented in a manner known to those skilled in the art.

Responsive to the various inputs, the controller controls the braking of each wheel in anti-lock braking mode during certain braking maneuvers, in traction control mode during certain vehicle acceleration maneuvers and in yaw rate control when yaw sensor 80 indicates a difference between the actual vehicle yaw rate and a desired vehicle yaw rate.

When the vehicle is in a vehicle braking maneuver, the controller monitors the wheel speed signals from sensors 28, 30, 32 and 34 and determines if one or more of the wheels is in or is about to be in an incipient lock-up condition, in which case anti-lock brake control mode for the one or more wheels is activated. In the anti-lock brake control mode, controller 68 determines and outputs commands to actuators 52, 54, 56 and 58 corresponding to the wheels in anti-lock brake mode to modulate brake force to the wheel brakes. Through control of actuators 52, 54, 56 and 58 in a known manner, the controller prevents the wheels from entering a lock-up condition while achieving effective brake control and steerability.

When the vehicle is not in a braking maneuver but is accelerating due to output motive force from the vehicle prime mover, control 68 monitors the wheel speeds sensed by sensors 28, 30, 32 and 34 to determine if the wheels transferring motive force to the road surface are slipping or are about to slip. In such conditions, controller 68 sends commands to actuators 52, 54, 56 and 58 corresponding to the appropriate wheels to reduce the slip. Such control is usually performed, in a known manner, in conjunction with a parallel control for the prime mover to temporarily reduce the motive force output until wheel to road traction is reestablished.

Controller 68 also performs an active brake control of the four wheel brakes 20, 22, 24 and 26 responsive to the steering angle signal on line 62, the yaw rate signal on line 81, the vehicle speed as calculated responsive to signals from the four wheel speed sensors 28, 30, 32 and 34 and the lateral acceleration on line 99. Using these signals, controller 68 determines a desired yaw rate and compares it with the actual yaw rate sensed by sensor 80. If the actual yaw rate differs from the desired yaw rate by more than a threshold that is dynamically determined, controller 68 determines and outputs commands to actuators 52, 54, 56 or 58 to control the vehicle wheel brakes 20, 22, 24 or 26 to bring the actual vehicle yaw rate into conformance with the desired yaw rate.

In carrying out these tasks, controller 68 typically includes a digital microcomputer including CPU, RAM, ROM and appropriate input and output circuits of a known type for receiving the various input signals and for outputting the various control commands to actuators 52, 54, 56 and 58. The activities of controller 68 are controlled by a program permanently stored in ROM or similar non-volatile memory. Further details of this program for controlling actuators 52, 54, 56 and 58 in anti-lock braking, traction control and vehicle yaw rate control may be found in the aforementioned U.S. Pat. No. 5,746,486 and other published documents.

As previously stated, controller 68 is programmed to control actuators 52, 54, 56 and 58 to provide braking fluid pressure, and thus braking force, to certain ones of wheel brakes 20, 22, 24 and 26 in order to correct an undesired yaw rate of vehicle 10 in dynamic situations. One of these situations is a vehicle understeer condition, in which a vehicle operator has commanded a turn of the vehicle through the steering apparatus 60 but the vehicle yaw rate is less, in the direction of the turn, than is desired according to the driver input. When this is detected, one or both of the wheel brakes of a selected axle—that is, either the front wheels or the rear wheels—is provided with increased or decreased brake fluid pressure by the appropriate one(s) of modulators 52, 54, 56 and 58 to produce an overall increased cross axle braking pressure difference in favor of the inside wheel to produce braking of the inner side wheel relative to the outer side wheel. This causes an increased cross axle wheel speed difference (between the inside and outside wheels) of the active axle—$\Delta V_{LR}$—in favor of the outer wheel. The increase in wheel speed of the outer wheel relative to the inner wheel effectively increases the vehicle yaw rate to decrease the magnitude of understeer. The brake pressure may be applied as an increased pressure on the inside wheel brake, a decreased brake pressure on the outside wheel brake or a combination of the two as appropriate to produce the desired difference. In the prior art, the selected, or active, axle is chosen as the rear axle except when anti-lock braking is active, in which case the front axle is chosen. The changes to this arrangement to be described below, with respect to the selected axle or wheels and the magnitude of the cross axle wheel speed difference, are in the operation of the system when anti-lock braking is not active.

Figure 2:
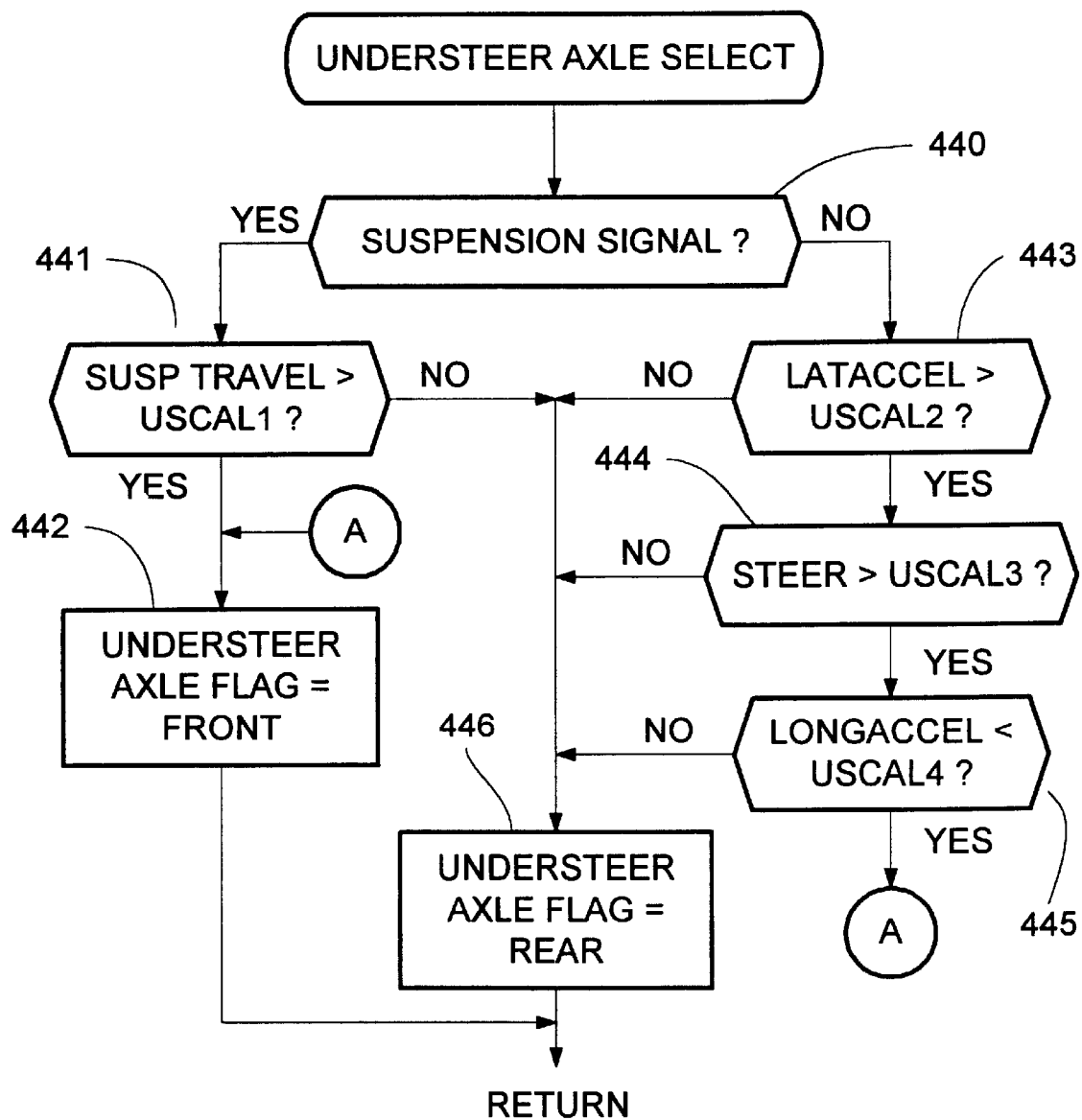
FIGS. 2 and 3 are flow charts illustrating the operation of the braking system of this invention in the braking system of FIG. 1.
Figure 3:
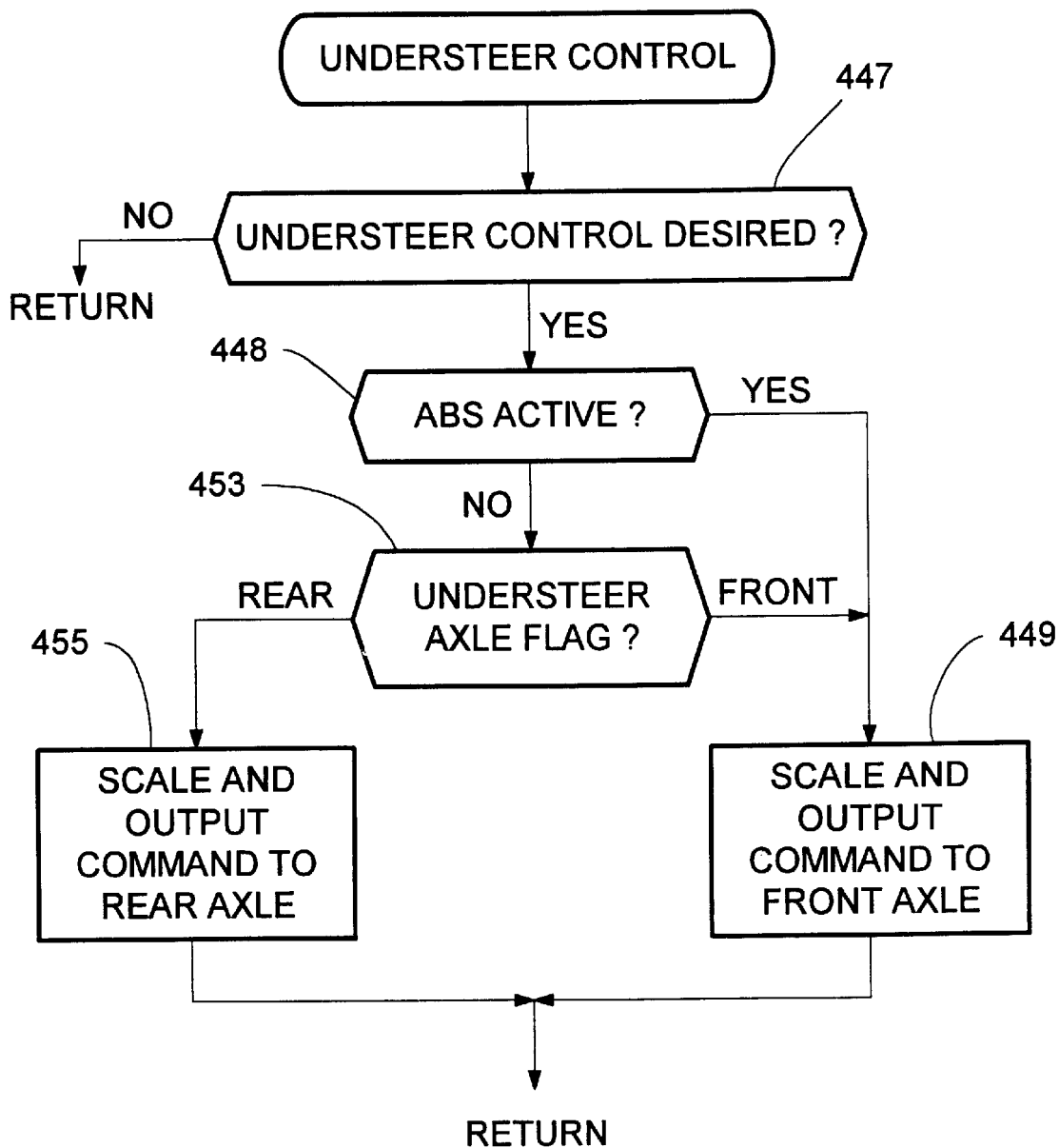

FIGS. 2 and 3 illustrate the operation of the apparatus of this invention through flow charts of a pair of computer program routines that are used together: a routine UNDERSTEER AXLE SELECT which sets a flag or status byte in computer memory to indicate the selected axle or pair of wheels (front or rear) to which understeer correction is to be applied, and a routine UNDERSTEER CONTROL which performs the understeer correction with reference to the flag or status byte. The routines may be combined into a single program, used as main routine and subroutine or used as two subroutines called from a larger program. Alternatively, one or both of the programs could be divided into smaller functional units and incorporated into an overall brake control such as a modification of the aforementioned U.S. Pat. No. 4,746,486, as will be described at a later point.

Referring to FIG. 2, routine UNDERSTEER AXLE SELECT begins by determining at step 440 whether there is a suspension controller providing a normal force or lateral traction indicating signal that can be used for axle selection. If there is such a signal available, the program reads it and bases an axle determination on it at step 441. In this embodiment, the signal includes a magnitude of suspension travel of the rear wheel of the vehicle on the inside of the turn, with large suspension travel corresponding to low normal force, and thus low traction, on the tire due to the raising of the body corner in which the wheel is located. This magnitude is compared with a calibrated reference USCAL1; and, if it exceeds the calibrated value, the understeer axle flag is set for the front axle in step 442. Alternatively, the program could derive the same body corner elevation indication from heave, pitch and/or roll signals supplied by the suspension controller or from normal force indications for the rear wheels based on force sensors or force estimations based on measured wheel or tire parameters, etc.

Returning to step 440, if there is no signal available from a suspension controller, the program makes an understeer axle determination from its own sensors and/or other signals available. In this embodiment, the program first compares a lateral acceleration signal LATACCEL from sensor 61 with a calibrated reference USCAL2 at step 443. If the magnitude of LATACCEL exceeds this calibrated reference, which indicates high lateral acceleration and likely body roll, the program proceeds to compare a steering angle signal STEER with a calibrated reference USCAL3 at step 444. If the magnitude of STEER exceeds this calibrated reference, which indicates a likely significant vehicle turn, the program proceeds to compare longitudinal acceleration LONGACCEL of the vehicle with a calibrated reference USCAL4 at step 445. If the magnitude of LONGACCEL is less than this calibrated reference and its sign indicates deceleration, which indicates likely forward body pitch, then all three indicators of a raised inside rear body corner are positive; and the program proceeds to step 442, at which the understeer axle flag is set for the front axle. From any of steps 441, 443, 444 and 445, if the opposite determination is made, the program sets the understeer axle flag for the rear axle at step 446. This is the preferred axle if the insider rear corner does not have significant normal force reduction. Thus, the selected axle for understeer correcting brake apply is stored in the understeer axle flag, for use by a part of the brake control program in controlling actuators 52, 54, 56 and 58.

Referring to FIG. 3, routine UNDERSTEER CONTROL is part of a brake control program that begins at step 447 by determining whether understeer correction is required. In this embodiment of the program, this could be based on the reading of a status byte or flag, set or reset elsewhere in the program by whatever system is used to detect understeer, the byte or flag indicating both the need for understeer (either yes/no or the magnitude of correction required) and the direction of the turn. If no understeer correction is required, the routine is exited. If understeer correction is required, anti-lock braking activity is checked at step 448. If ABS is active, the value of the correction command is scaled to produce a predetermined increase in braking force on the inside wheel as compared with the outside wheel, and the front pair of wheels is chosen for the application of the increase in step 449. If anti-lock braking is not active, the understeer axle flag is checked at step 453. If the flag indicates rear axle, the program proceeds to step 455, in which the value of the correction command is scaled to produce a predetermined change in cross-axle wheel speed, with the inside wheel decreasing relative to the outside wheel; and one or both of actuators 56 and 58, which control brakes 24 and 26 at the rear wheels of the vehicle, are activated to produce the commanded cross-axle difference. As described above, this could be the entire amount in an increased brake pressure at the inside rear wheel, the entire amount in a decreased brake pressure on the outside rear wheel or a combination of the two to produce the desired difference.

Alternatively, if the flag indicates front axle, the program proceeds to step 449, in which the value of the correction command is scaled for a different, larger change in cross-axle wheel speed, due to the lower efficiency of the inside front wheels in making an understeer correction; and one or both of actuators 52 and 54, which control brakes 20 and 22 at the front wheels of the vehicle, are activated to produce the commanded cross-axle difference. The upward scaling of the correction command for the front axle may be obtained by applying a scaling factor to a value stored in memory for the rear axle. As described above, the selected axle is preferably the rear axle but is changed to the front axle, with upwardly scaled magnitude, when the system receives information that the rear tires are likely reduced from their usually efficient understeer correction capability.

An example of a specific known braking system to which the invention described above may be applied is shown in the aforementioned U.S. Pat. No. 5,746,486, the disclosure of which is incorporated herein by reference. The brake control system of the patent is a closed loop yaw rate control by means of specific wheel braking with means for identifying understeer and applying a yaw rate correction in such manner as to correct for understeer when it is detected. The brake control system of the patent would be modified by adding the flow chart of FIG. 2 in this application as a subroutine to determine an understeer axle flag and incorporating the functions of the flow chart of FIG. 3 of this application into several places in the flow program illustrated by the flow charts of the patent. The subroutine determining the understeer axle flag of this invention would be run at an early point in the program, so that the flag may be used by the remainder of the program as required in the calculation of an understeer correction signal and the selection of the wheel to which the signal is applied.

In particular, the flow chart of FIG. 27 of the patent shows the derivation of the wheel speed difference between the left and right wheels of the active axle: $\Delta$VLR. The value calculated in this subroutine of the patent is appropriate for determination of braking force to the inside rear wheel. It is this value that is scaled up in the invention of this application to a larger magnitude for application to the inside front wheel when the inside rear wheel loses lateral traction in an understeer situation. Thus, the magnitude correction may be made by modifying the flow chart of FIG. 27 in the patent with additional steps after step 854 to (1) check an understeer axle flag (as in step 453 of this application) and (2) to scale the value of $\Delta$VLR upward by a predetermined amount if the understeer axle flag indicates that the front axle is the active axle rather than the rear axle normally used in a four channel brake control by the apparatus of the patent (as in step 449 of this application).

In addition, the flow charts of FIGS. 34 and 36A of the patent determine which of the front and rear axles will be active for a four channel brake system in an understeer situation. In FIG. 34 of the patent, a four channel system will produce a NO answer at step 214 and, in understeer, will produce a NO answer at step 216. A DFA flag will then be set TRUE or FALSE on the basis of whether ABS (anti-lock braking) is active: with TRUE for active and FALSE for not active. FIG. 36A of the patent shows a flow chart that selects the active axle in its very first step 250. The DFA flag determines that, for a four channel system in understeer, the front axle is picked if ABS is active (DFA=TRUE); but the rear axle is picked if ABS is not active (DFA=FALSE). The invention of this application provides a change in latter choice by specifying that, with ABS not active, the active axle will be the front axle when the understeer axle flag so specifies. Thus, the apparatus of the patent may be modified to operate in accordance with this invention by inserting a step between the "NO" (FALSE) side of step 250 and step 254 in which the understeer status flag is checked, with the result of REAR going to step 254 and the result of FRONT going to step 252. Reference number 254 is omitted from FIG. 36A in the patent, but it is the step that is shown as the next step from the NO side of 250, in which LAW (left active wheel)=LR and RAW (right active wheel)=RR. Other brake control systems may be similarly modified by those skilled in the art to incorporate the invention described and claimed herein.

What is claimed is:

1. Brake control apparatus for a steerable motor vehicle having a body, suspension apparatus supporting the body on a pair of front wheels and a pair of rear wheels and means for generating an understeer signal indicating an understeer condition of the vehicle, the brake control apparatus comprising:

anti-lock brake control apparatus for each of the pair of rear wheels and means for generating an anti-lock signal for each of the pair of rear wheels when the anti-lock brake control apparatus for that wheel is active;

means responsive to one or more sensors to detect in a vehicle turn a likely predetermined low traction on one of the pair of rear wheels on the inside of the turn due to vehicle body roll or pitch and provide a low traction indicating signal in response thereto;

means responsive to the understeer signal for generating an understeer correcting brake command to increase a brake pressure on a wheel on the inside of the turn relative to a brake pressure on a wheel on the outside of the turn and to apply the understeer correcting brake command to the pair of front wheels when the low traction indicating signal is provided and anti-lock braking is not active.

2. The brake control apparatus of claim 1 in which the understeer correcting brake command as applied to the pair of front wheels has a magnitude to produce a greater difference in brake pressure between the wheel on the inside of the turn and the wheel on the outside of the turn than the understeer correcting command as applied to the pair of rear wheels.

3. The brake control apparatus of claim 1 in which the means responsive to one or more sensors is responsive to a suspension position sensor associated with the one of the pair of rear wheels on the inside of the turn.

4. The brake control apparatus of claim 1 in which the means responsive to one or more sensors is responsive to one or more of a vehicle lateral accelerometer, a vehicle longitudinal accelerometer and a vehicle steer angle sensor.

5. The brake control apparatus of claim 1 further comprising a suspension control responsive to suspension sensors to generate a suspension signal indicative of a raised rear body corner on the inside of the turn, the means responsive to one or more sensors being responsive to the suspension signal to provide the low traction indicating signal.

6. The brake control apparatus of claim 1 in which the means responsive to one or more sensors is responsive to a vehicle lateral accelerometer and the low traction indicating signal requires that sensed vehicle lateral acceleration exceeds a predetermined lateral acceleration value.

7. The brake control apparatus of claim 6 which the means responsive to one or more sensors is further responsive to a vehicle steer angle sensor and the low traction indicating signal additionally requires that sensed vehicle steer angle exceeds a predetermined steer angle value.

8. The brake control apparatus of claim 1 in which the means responsive to one or more sensors is further responsive to a vehicle steer angle sensor and the low traction indicating signal requires that sensed vehicle steer angle exceeds a predetermined steer angle value.

9. Brake control apparatus for a steerable motor vehicle having a body, suspension apparatus supporting the body on a pair of front wheels and a pair of rear wheels and means for generating an understeer signal indicating an understeer condition of the vehicle, the brake control apparatus comprising:

means responsive to one or more sensors to detect in a vehicle turn a likely predetermined low traction on one of the pair of rear wheels on the inside of the turn and provide a low traction indicating signal in response thereto;

means responsive to the understeer signal for generating an understeer correcting brake command to increase a brake pressure on a wheel on the inside of the turn relative to a brake pressure on a wheel on the outside of the turn and to apply the understeer correcting brake command to the pair of front wheels when the low traction indicating signal is provided and, with no anti-lock braking active, to alternatively apply the understeer correcting brake command to the pair of rear wheels when the low traction indicating signal is not provided;

in which the means responsive to one or more sensors is responsive to one or more of a vehicle lateral accelerometer, a vehicle longitudinal accelerometer and a vehicle steer angle sensor, and in which the low traction indicating signal is provided if sensed vehicle lateral acceleration exceeds a first predetermined value, sensed vehicle longitudinal acceleration exceeds a second predetermined value in a deceleration direction and sensed vehicle steer angle exceeds a third predetermined value.

10. Brake control apparatus for a steerable motor vehicle having a body, suspension apparatus supporting the body on a pair of front wheels and a pair of rear wheels and means for generating an understeer signal indicating an understeer condition of the vehicle, the brake control apparatus comprising:

means responsive to one or more sensors to detect in a vehicle turn a likely predetermined low traction on one of the pair of rear wheels on the inside of the turn and provide a low traction indicating signal in response thereto;

means responsive to the understeer signal for generating an understeer correcting brake command to increase a brake pressure on a wheel on the inside of the turn relative to a brake pressure on a wheel on the outside of the turn and to apply the understeer correcting brake command to the pair of front wheels when the low traction indicating signal is provided and, with no anti-lock braking active, to alternatively apply the understeer correcting brake command to the pair of rear wheels when the low traction indicating signal is not provided;

in which the means responsive to one or more sensors is responsive to one or more of a vehicle lateral acceleration, a vehicle longitudinal deceleration and a vehicle steer angle, and in which the low traction indicating signal is provided if the vehicle lateral acceleration exceeds a first predetermined value, the vehicle longitudinal deceleration exceeds a second predetermined value and the vehicle steer angle exceeds a third predetermined value.

* * * * *